Patented June 17, 1924.

1,497,995

UNITED STATES PATENT OFFICE.

EUGEN SONNENFELD AND ARTHUR STOLL, OF BASEL, SWITZERLAND, ASSIGNORS TO CHEMICAL WORKS FORMERLY SANDOZ, OF BASEL, SWITZERLAND.

THERAPEUTICALLY-VALUABLE COMPOUND OF HEXAMETHYLENETETRAMINE.

No Drawing.  Application filed May 18, 1921.  Serial No. 470,661.

*To all whom it may concern:*

Be it known that we, EUGEN SONNENFELD, a citizen of the Czechoslovakian Republic, and ARTHUR STOLL, a citizen of the Swiss Republic, both residing in Basel, Switzerland, have invented a new and useful Therapeutically-Valuable Compound of Hexamethylenetetramine, of which the following is a full, clear, and exact specification.

We have found a new therapeutically valuable compound of hexamethylenetetramine wherein the hexamethylenetetramine is combined with the natural mixture of the gall acids of ox-gall, which are difficultly soluble in water. This new compound unites the known cholagogic action of the gall acids with the therapeutically valuable properties of the hexamethylenetetramine and can therefore be employed advantageously for the treatment of gall-stones.

According to the process for the preparation of this new compound, at least such a quantity of hexamethylenetetramine is allowed to react on the natural gall acids of animal gall, which are difficultly soluble in water, that there results a saltlike product dissolving in water to a clear solution. It constitutes in a dry state a white to slightly greenish hygroscopic powder easily, but somewhat slowly soluble in water. Its aqueous solution gives with strong acids at first a milky and then white precipitate which contrary to the higher fatty acids does not dissolve in benzine when agitated with this latter.

Example 1.

One prepares by dissolution of natural gall acids of ox gall which are difficultly soluble in water, an alcoholic solution of about 20 per cent, separates the solution from the slime which may perhaps be present, determines by titration of a sample with $\frac{1}{10}$ normal alkali-solution the degeree of acidity and adds then the equimolecular quantity of a solution of hexamethylenetetramine in alcohol as concentrated as possible. A sample of the mixture poured into water gives a clear solution. The alcoholic solution of the salt formed is then preferably evaporated to dryness in a vacuum at low temperature. The still viscous and foamy mass becomes brittle when dried completely in a vacuum desiccator and can be pulverized easily to a fine powder very difficultly soluble in acetone, but very easily soluble in water and alcohol giving a clear solution. By adding ether to the alcoholic solution there is obtained a precipitate which forms a greasy layer on the container wall, and dissolves at once by adding water giving a clear solution.

Example 2.

Natural gall acids, difficultly soluble in water and free from slime, are energetically ground in a mortar with as much of a concentrated, aqueous solution of hexamethylenetetramine as is necessary to form a produce which dissolves in water to a clear solution. The salt is then dried in vacuo until the weight remains constant.

The salt formation of hexamethylenetetramine with the natural gall acids, which are themselves difficultly soluble in water, occurs so readily, that the moisture necessary for granulation is sufficient. The acids and the base combine by simple mixing in a finely pulverized state.

What we claim is:

1. The herein described new therapeutically valuable saltlike compound advantageously applicable for the treatment of gall-stones and derived from hexamethylenetetramine and the natural mixture of the gall acids of ox-gall, which are difficultly soluble in water, the said compound being, in a dry state, a white to slightly greenish hygroscopic powder, dissolving very easily but somewhat slowly in water to a solution giving with strong acids at first a milky and then white precipitate, which contrary to the higher fatty acids does not dissolve in benzine, when agitated with this latter.

2. The herein described process for the manufacture of a new therapeutically valuable compound advantageously applicable for the treatment of gall stones, consisting in acting on the natural mixture of the gall acids of ox-gall, which are difficultly soluble in water, with such a quantity of hexamethylenetetramine as is necessary to form a saltlike product dissolving in water to a clear solution.

In witness whereof we have hereunto signed our names this third day of May 1921, in the presence of two subscribing witnesses.

EUGEN SONNENFELD.
ARTHUR STOLL.

Witnesses:
 FRIDA KURZ,
 AMAND RITTER.